(12) United States Patent
 Zhang et al.

(10) Patent No.: US 11,647,405 B2
(45) Date of Patent: May 9, 2023

(54) TECHNIQUES FOR REPORTING OF MULTIPLE CANDIDATE PANELS PER MEASURED DOWNLINK REFERENCE SIGNALS

(71) Applicant: QUALCOMM Incorporated, San Diego, CA (US)

(72) Inventors: Qian Zhang, Basking Ridge, NJ (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 151 days.

(21) Appl. No.: 17/141,858

(22) Filed: Jan. 5, 2021

(65) Prior Publication Data
US 2022/0217552 A1     Jul. 7, 2022

(51) Int. Cl.
*H04W 24/04* (2009.01)
*H04L 5/00* (2006.01)
(Continued)

(52) U.S. Cl.
CPC .......... *H04W 24/04* (2013.01); *H04L 5/0032* (2013.01); *H04L 5/16* (2013.01); *H04L 41/0668* (2013.01);
(Continued)

(58) Field of Classification Search
None
See application file for complete search history.

(56) References Cited

U.S. PATENT DOCUMENTS

2019/0297648 A1* 9/2019 Nagaraja .............. H04B 7/0632
2019/0306850 A1  10/2019 Zhang et al.
(Continued)

OTHER PUBLICATIONS

AT&T: "On Beam Recovery for Partial and Full Control Channel Failure", 3GPP TSG RAN WG1 Meeting NR#3, 3GPP Draft, R1-1716690 Beam Recovery for Partial and Full Control Channel Failure_Updated, 3rd Generation Partnership Project, vol. RAN WG1, No. Nagoya, Japan, Sep. 18, 2017-Sep. 21, 2017, (Sep. 18, 2017), pp. 1-7, XP051353812, Retrieved from the Internet: URL: https://www.3gpp.org/ftp/tsg_ran/WG1_RL1/TSGR1_AH/NR_AH_1709/Docs/R1-1716690.zip, [retrieved on Sep. 18, 2017], Sections 2, 3 figure 1, pp. 2, 3.
(Continued)

*Primary Examiner* — Jeffrey M Rutkowski
*Assistant Examiner* — Mehedi S Aley
(74) *Attorney, Agent, or Firm* — QUALCOMM Incorporated

(57) ABSTRACT

Aspects described herein relate to beam failure detection (BFD) for mixed control and/or control resource sets (CORESETs). In an example, the aspects may include identifying one or more groups of CORESETs, each of the one or more groups of CORESETs include at least one half-duplex (HD) CORESET, full-duplex (FD) CORESET, or combination thereof; receiving one or more of the at least one HD CORESET and FD CORESET of the one or more groups of CORESETs from a network entity; performing a BFD measurement procedure with a reference signal associated with at least one CORESET of the one or more groups of CORESETs; and detecting whether a cell level failure event or a group level failure event is triggered based on the BFD measurement procedure.

30 Claims, 6 Drawing Sheets

(51) Int. Cl.
  *H04L 5/16*      (2006.01)
  *H04L 41/0668*   (2022.01)
  *H04W 72/04*     (2023.01)
  *H04W 72/044*    (2023.01)
  *H04W 72/08*     (2009.01)

(52) U.S. Cl.
  CPC ..... *H04W 72/046* (2013.01); *H04W 72/0413* (2013.01); *H04W 72/082* (2013.01)

(56) References Cited

U.S. PATENT DOCUMENTS

| | | | |
|---|---|---|---|
| 2019/0306924 A1 | 10/2019 | Zhang et al. | |
| 2020/0214018 A1 | 7/2020 | Venugopal et al. | |
| 2020/0374960 A1* | 11/2020 | Deenoo | H04W 72/1284 |
| 2021/0105765 A1* | 4/2021 | Cirik | H04B 7/0639 |
| 2021/0143889 A1* | 5/2021 | Akoum | H04B 7/0417 |
| 2021/0211181 A1* | 7/2021 | Yang | H04W 72/0413 |
| 2021/0400654 A1* | 12/2021 | Ibrahim | H04L 5/0053 |
| 2022/0029761 A1* | 1/2022 | Su | H04L 5/0091 |
| 2022/0182211 A1* | 6/2022 | Zhang | H04W 72/1289 |
| 2022/0183041 A1* | 6/2022 | Zhang | H04W 72/046 |
| 2022/0200777 A1* | 6/2022 | Lee | H04L 5/14 |

OTHER PUBLICATIONS

International Search Report and Written Opinion—PCT/US2021/073124—ISA/EPO—dated May 9, 2022.

* cited by examiner

TECHNIQUES FOR REPORTING OF MULTIPLE CANDIDATE PANELS PER MEASURED DOWNLINK REFERENCE SIGNALS

BACKGROUND

Aspects of the present disclosure relate generally to wireless communication systems, and more particularly, to beam failure detection (BFD) associated with mixed control resource sets (CORESETs) for half duplex transmission mode and full duplex transmission mode if radio link management (RLM)/BFD reference signal (RS) is not explicitly configured by radio resource control (RRC) signaling Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as New Radio (NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

For example, for various communications technology such as, but not limited to NR, complex determination needs to be made for implicit BFD with mixed half duplex CORESET(s) and FD CORESET(s) if RLM/BFD RS is not explicitly configured. Thus, improvements in wireless communication operations may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method of wireless communication at a user equipment (UE) is provided. The method may include identifying one or more groups of control resource sets (CORESETs), each of the one or more groups of CORESETs include at least one half-duplex (HD) CORESET, full-duplex (FD) CORESET, or combination thereof; receiving one or more of the at least one HD CORESET and FD CORESET of the one or more groups of CORESETs from a network entity; performing a beam failure detection (BFD) measurement procedure with a reference signal associated with at least one CORESET of the one or more groups of CORESETs; and detecting whether a cell level failure event or a group level failure event is triggered based on the BFD measurement procedure.

In a further example, an apparatus for wireless communication is provided that includes a transceiver, a memory configured to store instructions, and one or more processors communicatively coupled with the transceiver and the memory. The one or more processors are configured to execute the instructions to identify one or more groups of CORESETs, each of the one or more groups of CORESETs include at least one HD CORESET, FD CORESET, or combination thereof; receive one or more of the at least one HD CORESET and FD CORESET of the one or more groups of CORESETs from a network entity; perform a BFD measurement procedure with a reference signal associated with at least one CORESET of the one or more groups of CORESETs; and detect whether a cell level failure event or a group level failure event is triggered based on the BFD measurement procedure.

In another aspect, an apparatus for wireless communication is provided that includes means for identifying one or more groups of CORESETs, each of the one or more groups of CORESETs include at least one HD CORESET, FD CORESET, or combination thereof; means for receiving one or more of the at least one HD CORESET and FD CORESET of the one or more groups of CORESETs from a network entity; means for performing a BFD measurement procedure with a reference signal associated with at least one CORESET of the one or more groups of CORESETs; and means for detecting whether a cell level failure event or a group level failure event is triggered based on the BFD measurement procedure.

In yet another aspect, a non-transitory computer-readable medium is provided including code executable by one or more processors to identify one or more groups of CORESETs, each of the one or more groups of CORESETs include at least one HD CORESET, FD CORESET, or combination thereof; receive one or more of the at least one HD CORESET and FD CORESET of the one or more groups of CORESETs from a network entity; perform a BFD measurement procedure with a reference signal associated with at least one CORESET of the one or more groups of CORESETs; and detect whether a cell level failure event or a group level failure event is triggered based on the BFD measurement procedure.

According to another example, a method of wireless communication at a network entity is provided. The method may include determining one or more groups of CORESETs, each of the one or more groups of CORESETs include at least one HD CORESET, FD CORESET, or combination thereof; transmitting one or more of the at least one HD CORESET and FD CORESET of the one or more groups of CORESETs to a UE; and receiving a beam failure recovery request from the UE based on at least one of a cell level failure event or a group level failure event that is triggered based on a BFD measurement procedure at the UE.

In a further example, an apparatus for wireless communication is provided that includes a transceiver, a memory configured to store instructions, and one or more processors communicatively coupled with the transceiver and the memory. The one or more processors are configured to execute the instructions to determine one or more groups of CORESETs, each of the one or more groups of CORESETs include at least one HD CORESET, FD CORESET, or combination thereof; transmit one or more of the at least one HD CORESET and FD CORESET of the one or more groups of CORESETs to a UE; and receive a beam failure recovery request from the UE based on at least one of a cell level failure event or a group level failure event that is triggered based on a BFD measurement procedure at the UE.

In another aspect, an apparatus for wireless communication is provided that includes means for determining one or more groups of CORESETs, each of the one or more groups of CORESETs include at least one HD CORESET, FD CORESET, or combination thereof; means for transmitting one or more of the at least one HD CORESET and FD CORESET of the one or more groups of CORESETs to a UE; and means for receiving a beam failure recovery request from the UE based on at least one of a cell level failure event or a group level failure event that is triggered based on a BFD measurement procedure at the UE.

In yet another aspect, a non-transitory computer-readable medium is provided including code executable by one or more processors to determine one or more groups of CORESETs, each of the one or more groups of CORESETs include at least one HD CORESET, FD CORESET, or combination thereof; transmit one or more of the at least one HD CORESET and FD CORESET of the one or more groups of CORESETs to a UE; and receive a beam failure recovery request from the UE based on at least one of a cell level failure event or a group level failure event that is triggered based on a BFD measurement procedure at the UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
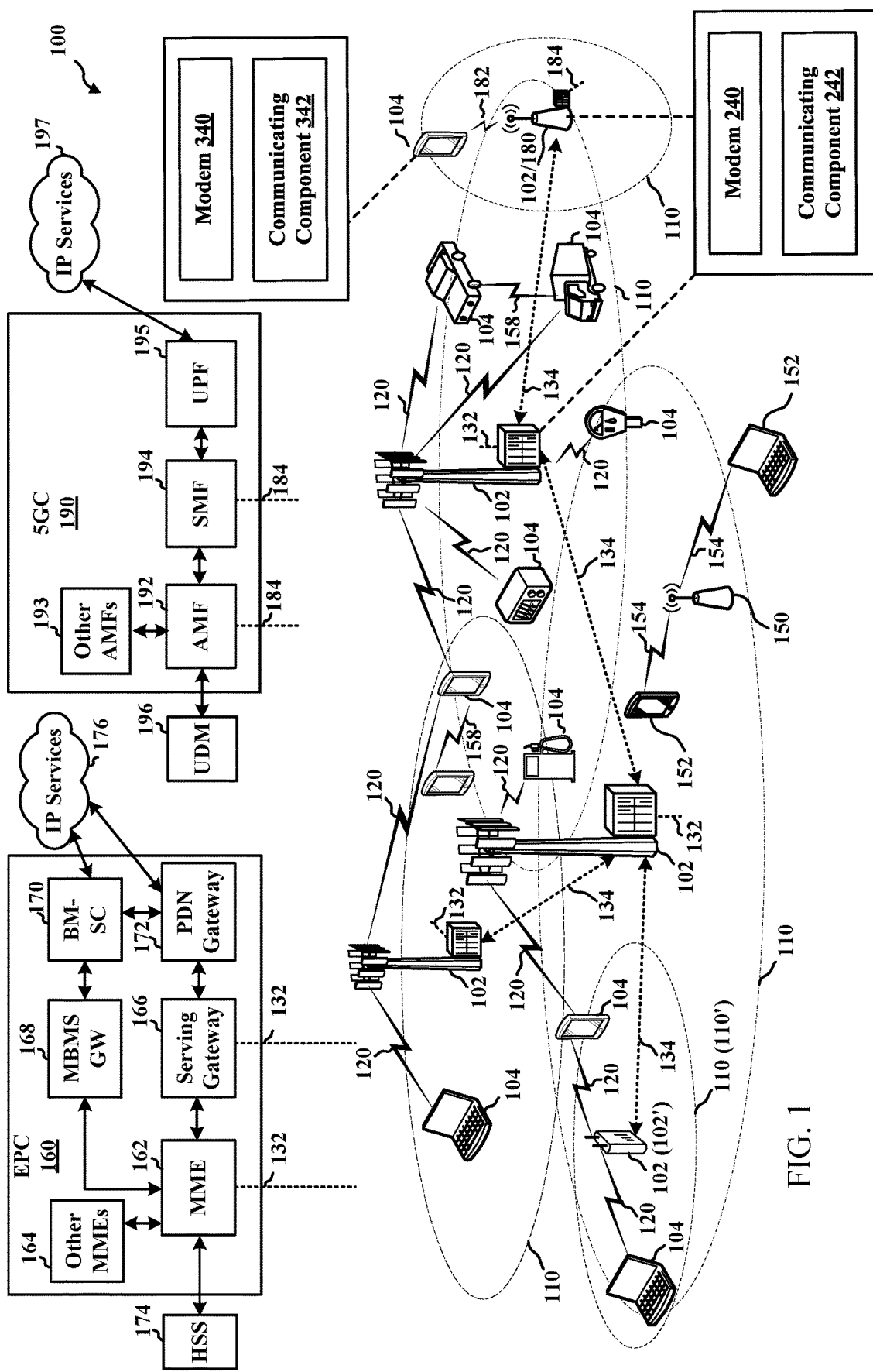
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to beam failure detection (BFD) associated with mixed control resource sets (CORESETs) for half duplex transmission mode and full duplex transmission mode if radio link management (RLM)/BFD reference signal (RS) is not explicitly configured by radio resource control (RRC) signaling. In an aspect, a user equipment (UE) and a base station may communicate with each other using Tx and Rx beams. For example, a beam may be a downlink beam (e.g., on which information may be conveyed from the base station to the UE) or an uplink beam (e.g., on which information may be conveyed from the UE to the base station).

A user equipment (UE) and/or a base station may communicate in a full duplex mode in which uplink communication and downlink communication is exchanged in a same frequency band, or partially overlapped frequency band, or separate frequency bands at overlapping times or simultaneously. The UE and the base station may exchange communication using a downlink and uplink beam pair. The UE may perform ongoing uplink or downlink transmissions at different times in a half-duplex mode (either via an uplink beam or via a downlink beam). A full duplex link may provide increased scalability of data rates on the link in comparison to a half duplex link. Full duplex capability may be present at either the gNB or the UE or both. For example, at the UE, uplink transmissions may occur from one panel and downlink reception may occur in another panel. The full duplex capability may be conditional on beam separation.

In a full duplex link, different antenna elements, subarrays, or antenna panels of a wireless communication device may simultaneously or contemporaneously perform uplink and downlink communication. The benefits of full duplex communications include latency reduction (e.g., a possibility to receive downlink signals in uplink only slots which enables latency savings), spectrum efficiency enhancement (e.g., per cell and/or per UE), and more efficient resource utilization.

A UE may monitor reference signals transmitted by a base station to detect one or more beam failures. A beam failure may occur due to changing channel conditions, obstacles (e.g., physical barriers such as buildings and/or walls that inhibit the transmission of wireless signals), distance from the base station transmitting the beam, interference, and/or the like. When a reference signal of a first set of beams fails to satisfy a threshold (e.g., a Qout threshold (e.g., the Qout threshold corresponds to 10% block error rate (BLER) of a hypothetical PDCCH transmission taking into account the PCFICH errors) and/or the like) on a particular number of one or more monitoring occasions, the UE may identify a beam failure. The UE may perform a beam recovery procedure upon detecting a beam failure, as described in detail elsewhere herein. The reference signals monitored by the UE may be explicitly configured by the base station. If not configured, reference signals monitored by the UE may be implicitly indicated by the same QCLed RSs as a control channel, which may be identified by a CORESET.

Full duplex communication may present certain challenges in comparison to half duplex communication. For example, a wireless communication device (e.g., a UE or a base station) may experience self-interference between an uplink beam and a downlink beam of a full duplex link or between components of the wireless communication device. This self-interference may complicate the monitoring of reference signals to detect beam failure. Furthermore, self-interference, cross-correlation, and/or the like, may occur in a full duplex link that may not occur in a half duplex link, so the RSs associated with a CORESET for monitoring beam failure in a half duplex link (e.g., the resource allocations, the thresholds, and/or the like) may not be suitable or ideal for monitoring beam failure in a full duplex link due to such self-interference or cross-correlation.

As such, the present disclosure relates to BFD associated with mixed CORESETs for half duplex transmission mode and full duplex transmission mode if RLM/BFD RS is not explicitly configured by RRC signaling. Specifically, the present disclosure provides for enhancing bi-directional communication between a UE and a network entity. In an aspect, the present disclosure provides apparatus and methods for identifying one or more groups of CORESETs, each of the one or more groups of CORESETs include at least one HD CORESET, FD CORESET, or combination thereof; receiving one or more of the at least one HD CORESET and FD CORESET of the one or more groups of CORESETs from a network entity; performing a BFD measurement procedure with a reference signal associated with at least one CORESET of the one or more groups of CORESETs; and detecting whether a cell level failure event or a group level failure event is triggered based on the BFD measurement procedure. In an aspect, the present disclosure provides apparatus and methods for determining one or more groups of CORESETs, each of the one or more groups of CORESETs include at least one HD CORESET, FD CORESET, or combination thereof; transmitting one or more of the at least one HD CORESET and FD CORESET of the one or more groups of CORESETs to a UE; and receiving a beam failure recovery request from the UE based on at least one of a cell level failure event or a group level failure event that is triggered based on a BFD measurement procedure at the UE.

The described features will be presented in more detail below with reference to FIGS. 1-6.

As used in this application, the terms "component," "module," "system" and the like are intended to include a computer-related entity, such as but not limited to hardware, software, a combination of hardware and software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) NR networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102, which may also be referred to as network entities, may include macro cells (high power cellular base station) and/or small cells (low power cellular base station). The macro cells can include base stations. The small cells can include femtocells, picocells, and microcells. In an example, the base stations 102 may also include gNBs 180, as described further herein.

In one example, some nodes such as base station 102/gNB 180, may have a modem 240 and a communicating component 242 which may (either in combination and/or separately) be configured for determining and transmitting one or more groups of CORESETs 248 including at least one of HD CORESET 250 and FD CORESET 252, or combination thereof, as described herein. Though a base station 102/gNB 180 is shown as having the modem 240 and communicating component 242, this is one illustrative example, and substantially any node or type of node may include a modem 240 and communicating component 242 for providing corresponding functionalities described herein.

In one example, a UE, such as UE 104, may have a modem 340 and a communicating component 342 which may (either in combination and/or separately) be configured for reporting of multiple candidate panels per measured downlink reference signals, as described herein. For example, UE 104 in conjunction with modem 340 and/or communicating component 342 may receive one or more of the at least one HD CORESET 250 and FD CORESET 252 of the one or more groups of CORESETs 248 from a base station 102, perform a BFD measurement procedure and transmit a BFD report indicating multiple candidate panels to base station 102. Though a UE 104 is shown as having the modem 340 and communicating component 342, this is one illustrative example, and substantially any node or type of node may include a modem 340 and communicating component 342 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 132, 134 and/or 184 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range.

The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a AMF 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a positioning system (e.g., satellite, terrestrial), a multimedia device, a video device, a digital audio player (e.g., MP3 player), a camera, a game console, a tablet, a smart device, robots, drones, an industrial/manufacturing device, a wearable device (e.g., a smart watch, smart clothing, smart glasses, virtual reality goggles, a smart wristband, smart jewelry (e.g., a smart ring, a smart bracelet)), a vehicle/a vehicular device, a meter (e.g., parking meter, electric meter, gas meter, water meter, flow meter), a gas pump, a large or small kitchen appliance, a medical/healthcare device, an implant, a sensor/actuator, a display, or any other similar functioning device. Some of the UEs 104 may be referred to as IoT devices (e.g., meters, pumps, monitors, cameras, industrial/manufacturing devices, appliances, vehicles, robots, drones, etc.). IoT UEs may include MTC/enhanced MTC (eMTC, also referred to as CAT-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
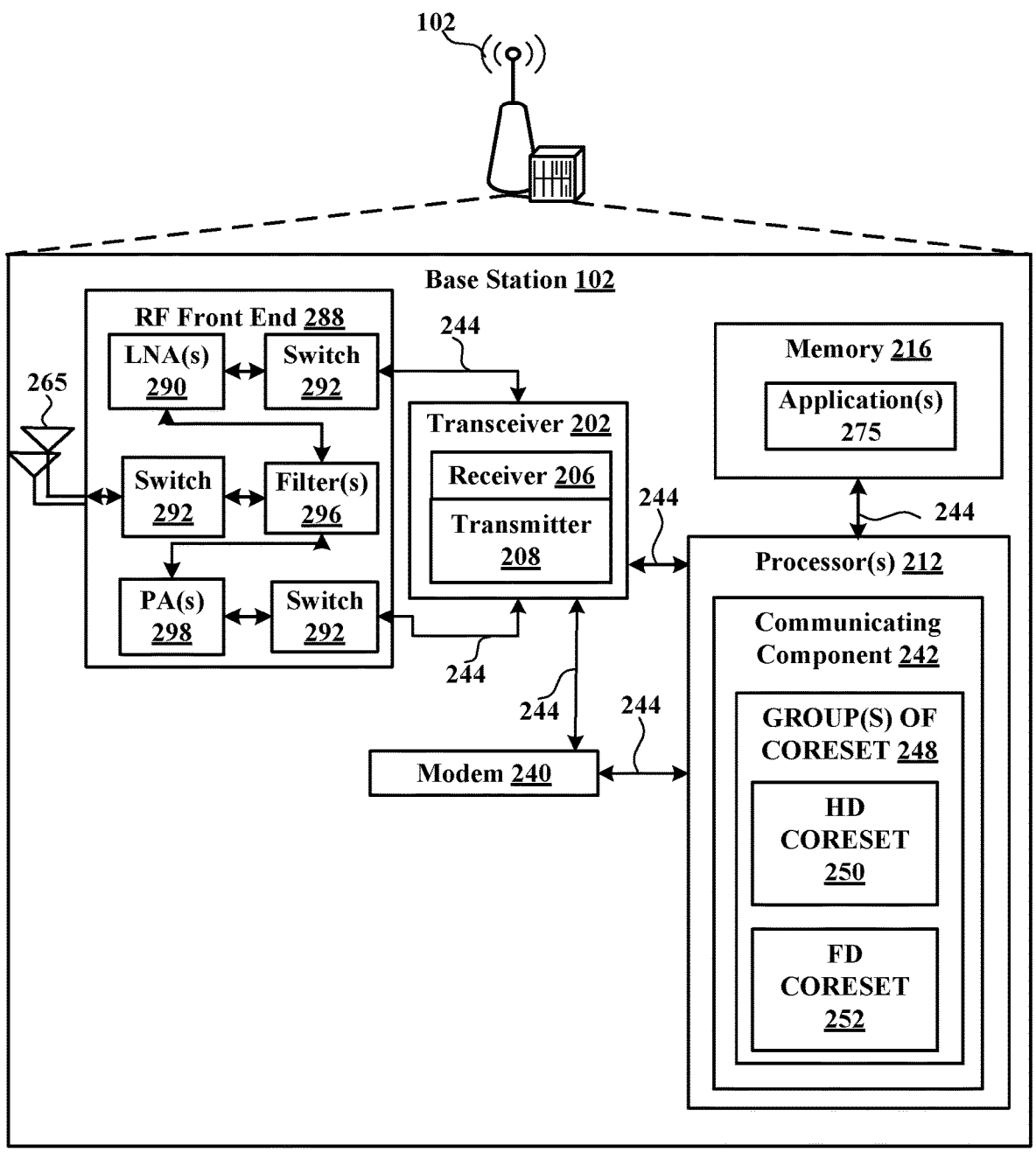
FIG. 2 is a block diagram illustrating an example of a network entity (also referred to as a base station), in accordance with various aspects of the present disclosure.
Figure 3:
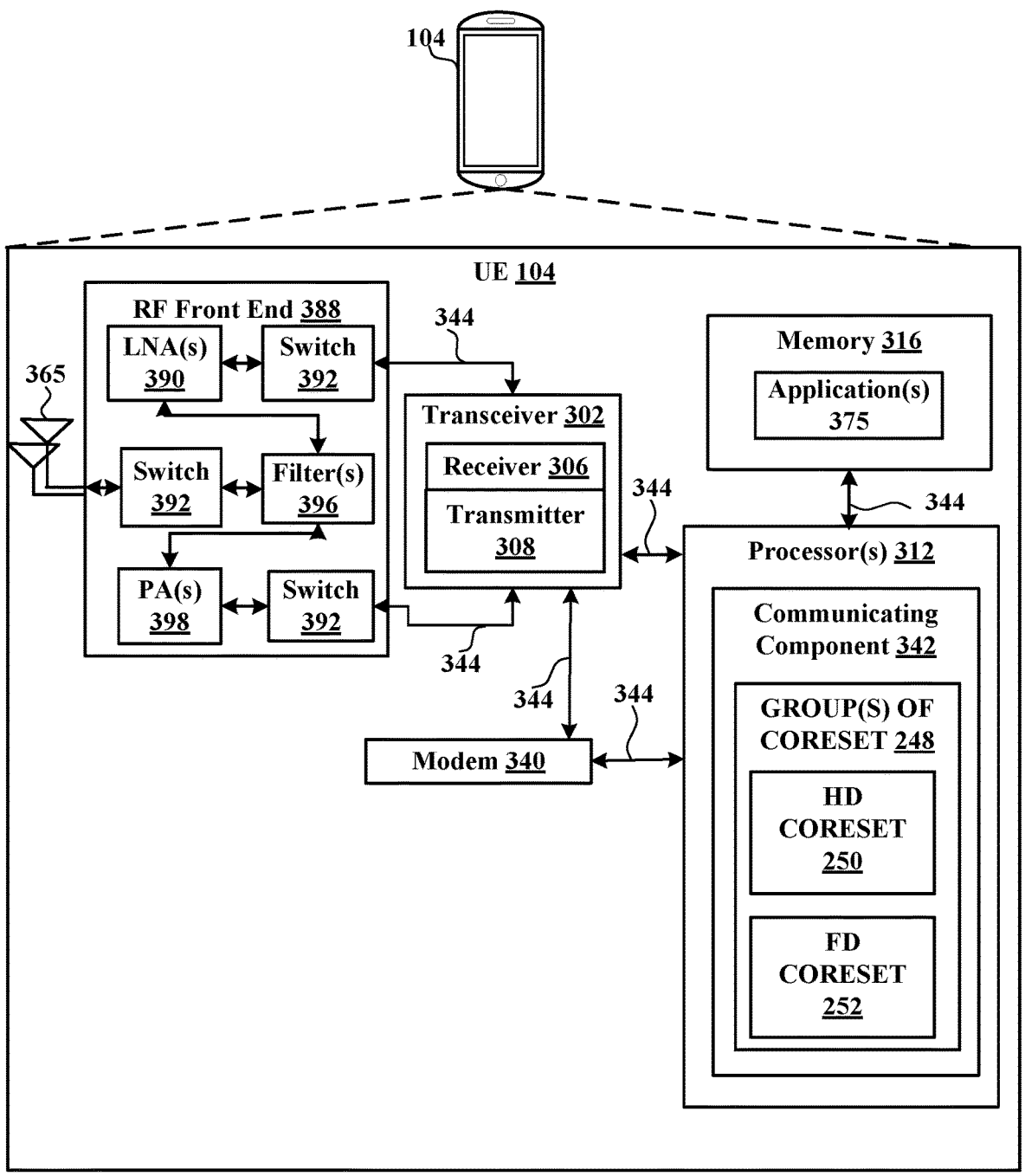
FIG. 3 is a block diagram illustrating an example of a user equipment (UE), in accordance with various aspects of the present disclosure.
Figure 4:
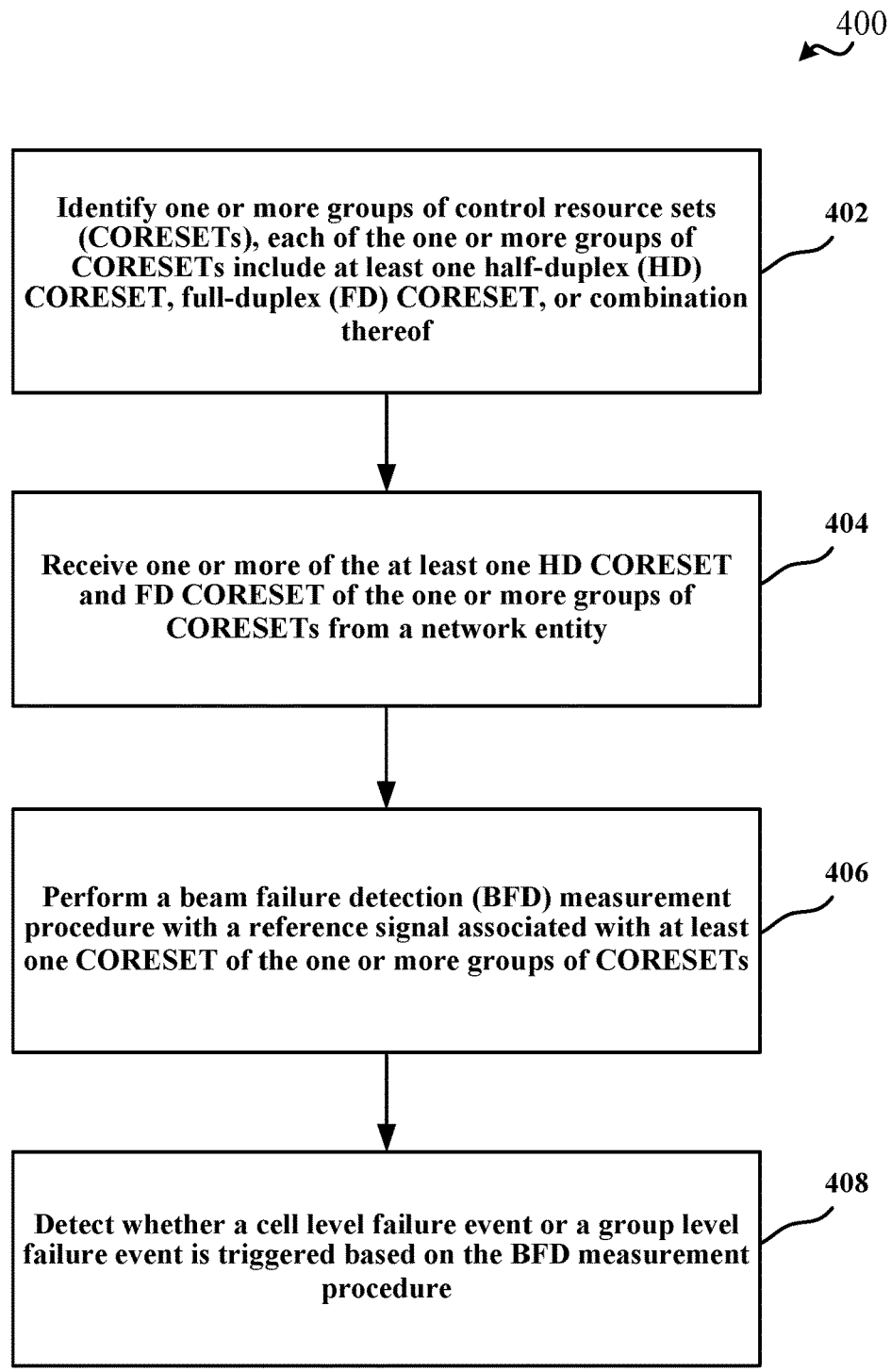
FIG. 4 is a flow chart illustrating an example of a method for wireless communications at a UE in accordance with various aspects of the present disclosure.
Figure 5:
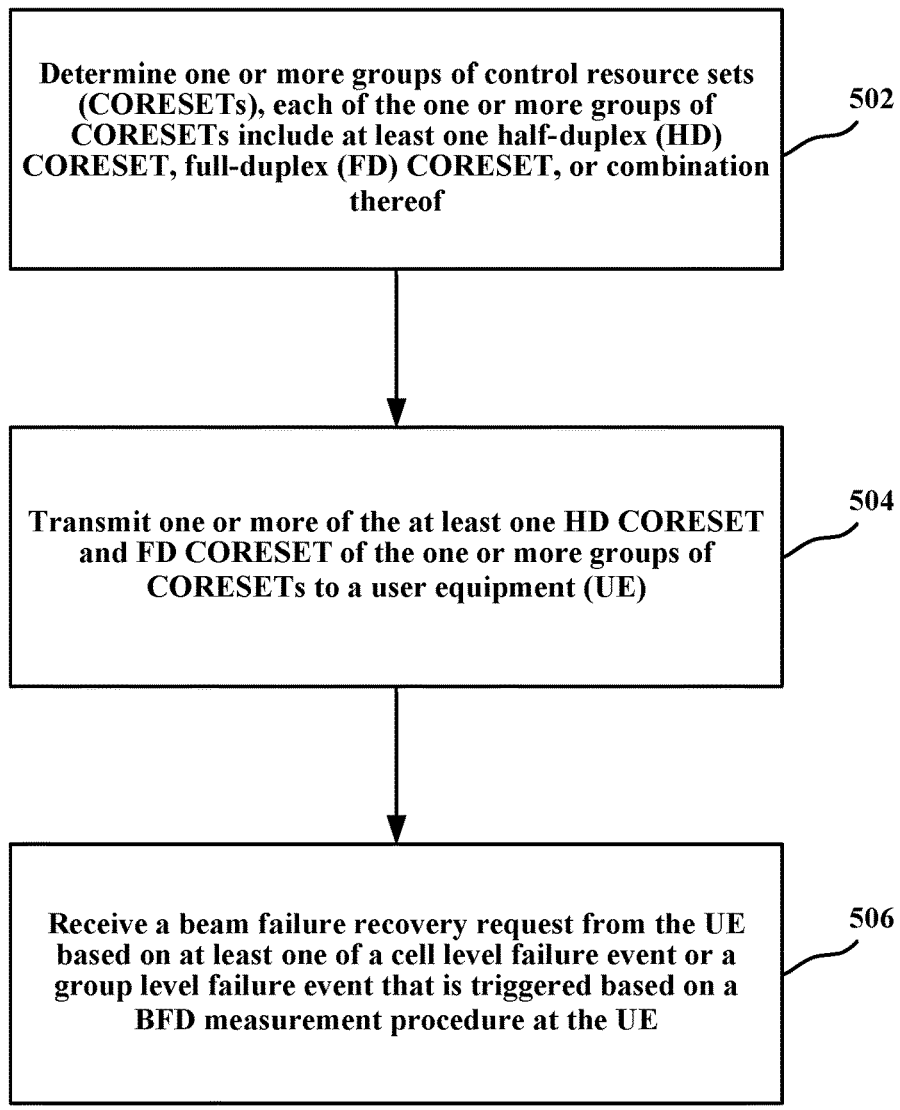
FIG. 5 is a flow chart illustrating an example of a method for wireless communications at a network entity in accordance with various aspects of the present disclosure.

Turning now to FIGS. 2-5, aspects are depicted with reference to one or more components and one or more methods that may perform the actions or operations described herein, where aspects in dashed line may be optional. Although the operations described below in FIGS. 4 and 5 are presented in a particular order and/or as being performed by an example component, it should be understood that the ordering of the actions and the components performing the actions may be varied, depending on the implementation. Moreover, it should be understood that the following actions, functions, and/or described components may be performed by a specially-programmed processor, a processor executing specially-programmed software or computer-readable media, or by any other combination of a hardware component and/or a software component capable of performing the described actions or functions.

Referring to FIG. 2, one example of an implementation of a node, such as base station 102 (e.g., a base station 102 and/or gNB 180, as described above) may include a variety of components, some of which have already been described above and are described further herein, including components such as one or more processors 212 and memory 216 and transceiver 202 in communication via one or more buses 244, which may operate in conjunction with modem 240 and/or communicating component 242 for determining and transmitting one or more groups of CORESETs 248 including at least one of HD CORESET 250 and FD CORESET 252, or combination thereof.

In an aspect, the one or more processors 212 can include a modem 240 and/or can be part of the modem 240 that uses one or more modem processors. Thus, the various functions related to communicating component 242 may be included in modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with communicating component 242 may be performed by transceiver 202.

Also, memory 216 may be configured to store data used herein and/or local versions of applications 275 or communicating component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining communicating component 242 and/or one or more of its subcomponents, and/or data associated therewith, when base station 102 is operating at least one processor 212 to execute communicating component 242 and/or one or more of its subcomponents.

Transceiver 202 may include at least one receiver 206 and at least one transmitter 208. Receiver 206 may include hardware and/or software executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware and/or software executable by a processor for transmitting data, the code comprising instructions and being stored in a memory (e.g., computer-readable medium). A suitable example of transmitter 208 may including, but is not limited to, an RF transmitter.

Moreover, in an aspect, base station 102 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals. The antennas 265 may include one or more antennas, antenna elements, and/or antenna arrays.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 240 can configure transceiver 202 to operate at a specified frequency and power level based on the UE configuration of the UE 104 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, the processor(s) 212 may correspond to one or more of the processors described in connection with the UE in FIG. 6. Similarly, the memory 216 may correspond to the memory described in connection with the UE in FIG. 6.

Referring to FIG. 3, one example of an implementation of UE 104 may include a variety of components, some of which have already been described above and are described further herein, including components such as one or more processors 312 and memory 316 and transceiver 302 in communication via one or more buses 344, which may operate in conjunction with modem 340 and/or communicating component 342 for identifying one or more groups of CORESETs 248, each of the one or more groups of CORESETs 248 include at least one HD CORESET 250, FD CORESET 252, or combination thereof.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of base station 102, as described above, but configured or otherwise programmed for base station operations as opposed to base station operations.

In an aspect, the processor(s) 312 may correspond to one or more of the processors described in connection with the base station in FIG. 6. Similarly, the memory 316 may correspond to the memory described in connection with the base station in FIG. 6.

The described features generally relate to BFD associated with mixed CORESETs for half duplex transmission mode and full duplex transmission mode if RLM/BFD RS is not explicitly configured by RRC signaling. In an aspect, two groups of CORESETs may be established. For example, the first group may include only HD CORESET(s) and the second group may include only FD CORESET(s). In this example, four CORESETs may be established. The first group may include two CORESETs which correspond to HD CORESETs while the second group may include the other two CORESETs corresponding to the FD CORESETs. The groups may be predetermined at the gNB and/or the UE.

In another example, two groups of mixed HD and FD CORESETs may be defined. In this example, four CORESETs may be established. The first group may include two CORESETs which correspond to a FD CORESET and a HD CORESET. Similarly, the second group may include two CORESETs which correspond to a FD CORESET and a HD CORESET. Different groups may be defined for different transmission reception points (TRPs) or TRP pairs. The groups may be signaled by the gNB to the UE.

In an aspect, for channel state information-reference signal (CSI-RS) as the BFD RS, the UE may determine the TCI state (e.g., CSI-RS beam) quasi co-located (QCLed) type D in the corresponding HD or FD CORESET ID. The UE may perform downlink beam BFD/RRM measurements at corresponding CSI-RS resource locations for the CSI-RS beam corresponding to the TCI state. For FD BFD RS, other than CSI-RS, the UL beam needs to be determined (e.g. a sounding reference signal (SRS) beam that is paired with the CSI-RS beam in the corresponding FD CORESET ID). Subsequently, the UE may perform UL beam (e.g., self-interference) BFD/RRM measurements to measure the SRS ID beam in the configured resources. For HD mode, with one or more DL CSI-RS beams, the UE may calculate L1-RSRPs for BFD/RRM. For FD mode, with one or more paired DL CSI-RS and UL SRS beam pairs, UE may calculate L1-SINRs for BFD/RRM.

In an aspect, full beam failure may correspond to a cell level failure and partial beam failure may correspond to a group level failure. For example, for two groups of CORESETs, both groups' failure may be indicated as full beam failure which may be triggered as an event of a cell level failure. Further, the HD CORESET group may be defined as a partial beam failure, which may be triggered as an event of a group level failure. Additionally, the FD CORESET group may be defined as partial beam failure as well, which may be triggered an event of as a group level failure.

In an aspect, for one of the two groups of CORESETs, the one group's failure may be indicated as full beam failure which may be triggered as an event of a cell level failure. For example, HD CORESET group may be defined as full beam failure, which may be triggered as an event of a cell level failure. Additionally, the FD CORESET group may be defined as partial beam failure, triggered as an event of a group level failure. In another example, the FD CORESET group may be defined as full beam failure, which may be triggered as an event of a cell level failure. Further, the HD CORESET group may be defined as partial beam failure, which may be triggered as an event of a group level failure. The determination for how each aspect may be defined may be pre-determined. If bot aspects are enabled, then the gNB may signal the determination for BFD.

Turning now to FIGS. 4 and 5, aspects are depicted with reference to one or more components and one or more methods that may perform the actions or operations described herein, where aspects in dashed line may be optional. Although the operations described below in FIGS. 4 and 5 are presented in a particular order and/or as being performed by an example component, it should be understood that the ordering of the actions and the components performing the actions may be varied, depending on the implementation. Moreover, it should be understood that the following actions, functions, and/or described components may be performed by reference to one or more components of FIGS. 1, 2, 4 and/or 6, as described herein, a specially-programmed processor, a processor executing specially-programmed software or computer-readable media, or by any other combination of a hardware component and/or a software component capable of performing the described actions or functions.

FIG. 4 illustrates a flow chart of an example of a method 400 for wireless communication at a network entity, such as the UE 104. In an example, a UE 104 can perform the functions described in method 400 using one or more of the components described in FIGS. 1, 2, 4, and 6.

At block 402, the method 400 may identify one or more groups of CORESETs, each of the one or more groups of CORESETs include at least one HD CORESET, FD CORESET, or combination thereof. In an aspect, the communicating component 342, e.g., in conjunction with processor(s) 312, memory 316, and/or transceiver 302, may be configured to identify one or more groups of CORESETs 248, each of the one or more groups of CORESETs 248 include at least one HD CORESET 250, FD CORESET 252, or combination thereof. Thus, the UE 104, the processor(s) 312, the communicating component 342 or one of its subcomponents may define the means for identifying one or more groups of CORESETs 248, each of the one or more groups of CORESETs 248 include at least one HD CORESET 250, FD CORESET 252, or combination thereof.

In some aspects, the one or more groups of CORESETs 248 include a first group comprising only of one or more HD CORESETs 250 and a second group comprising only of one or more FD CORESETs 252.

In some aspects, each of the one or more groups of CORESETs 248 includes a combination of one or more HD CORESETs 250 and one or more FD CORESETs 252.

In some aspects, each of one or more transmission reception points (TRPs) or TRP pairs include different groups of the one or more groups of CORESETs 248. For example, the TRPs may correspond to one or more of a UE, such as UE 104, and a network entity, such as base station 102.

In some aspects, the UE 104, the processor(s) 312, the communicating component 342 or one of its subcomponents configured for identifying the one or more groups of CORESETs 248 further comprises receiving a message indicating the one or more groups of CORESETs 248 from the network entity 102.

At block 404, the method 400 may receive one or more of the at least one HD CORESET and FD CORESET of the one or more groups of CORESETs from a network entity. In an aspect, the communicating component 342, e.g., in conjunction with processor(s) 312, memory 316, and/or transceiver 302, may be configured to receive one or more of the at least one HD CORESET 250 and FD CORESET 252 of the one or more groups of CORESETs 248 from a network entity 102. Thus, the UE 104, the processor(s) 312, the communicating component 342 or one of its subcomponents may define the means for receiving one or more of the at least one HD CORESET 250 and FD CORESET 252 of the one or more groups of CORESETs 248 from a network entity 102.

At block 406, the method 400 may perform a BFD measurement procedure with a reference signal associated with at least one CORESET of the one or more groups of CORESETs. In an aspect, the communicating component 342, e.g., in conjunction with processor(s) 312, memory 316, and/or transceiver 302, may be configured to perform a BFD measurement procedure with a reference signal associated with at least one CORESET of the one or more groups of CORESETs 248. Thus, the UE 104, the processor(s) 312, the communicating component 342 or one of its subcomponents may define the means for performing a BFD measurement procedure with a reference signal associated with at least one CORESET of the one or more groups of CORESETs 248.

In some aspects, the UE 104, the processor(s) 312, the communicating component 342 or one of its subcomponents configured for performing the BFD measurement procedure with the reference signal further comprises determining a reference signal associated with a transmission configuration indicator (TCI) state quasi co-located (QCLed) Type D in a corresponding identification (ID) for the at least one HD CORESET 250 and FD CORESET 252 if the BFD reference signal is not explicitly configured.

In some aspects, the reference signal corresponds to a channel state information RS (CSI-RS) or a SSB.

In some aspects, the UE 104, the processor(s) 312, the communicating component 342 or one of its subcomponents may be configured for performing downlink BFD/radio resource management (RRM) measurement procedure at a one or more CSI-RS resource locations for a CSI-RS beam corresponding to the TCI state.

In some aspects, the UE 104, the processor(s) 312, the communicating component 342 or one of its subcomponents may be configured for calculating a Layer 1 (L1) reference signal receive power (RSRP) for the BFD/RRM measurement procedure based on one or more downlink CSI-RS beams.

In some aspects, the UE 104, the processor(s) 312, the communicating component 342 or one of its subcomponents may be configured for detecting an uplink beam corresponding to a sounding reference signal (SRS) beam paired with a CSI-RS beam corresponding to the bi-directional TCI state that may include a downlink and uplink RS/beam pair in the corresponding ID for the FD CORESET 252, performing uplink BFD/RRM measurement procedure for the SRS uplink beam to measure self-interference, and performing downlink BFD/RRM measurement procedure for the CSI-RS or SSB downlink beam to measure downlink signal quality.

In some aspects, the UE 104, the processor(s) 312, the communicating component 342 or one of its subcomponents may be configured for calculating a L1 signal-to-interference-plus-noise ratio (SINR) for the BFD/RRM measurement procedure based on one or more downlink CSI-RS beams and uplink SRS beam pairs.

At block 408, the method 400 may detect whether a cell level failure event or a group level failure event is triggered based on the BFD measurement procedure. In an aspect, the communicating component 342, e.g., in conjunction with processor(s) 312, memory 316, and/or transceiver 302, may be configured to detect whether a cell level failure event or a group level failure event is triggered based on the BFD measurement procedure. Thus, the UE 104, the processor(s) 312, the communicating component 342 or one of its subcomponents may define the means for detecting whether a cell level failure event or a group level failure event is triggered based on the BFD measurement procedure.

In some aspects, the UE 104, the processor(s) 312, the communicating component 342 or one of its subcomponents may be configured for performing a failure recovery procedure in response to detecting at least one of the cell level failure event or the group level failure event.

In some aspects, the UE 104, the processor(s) 312, the communicating component 342 or one of its subcomponents may be configured for detecting an uplink beam corresponding to a sounding reference signal (SRS) beam paired with a CSI-RS beam corresponding to the bi-directional TCI state that may include a downlink and uplink RS/beam pair in the corresponding ID for the FD CORESET 252, performing uplink BFD/RRM measurement procedure for the SRS uplink beam to measure self-interference, and performing downlink BFD/RRM measurement procedure for the CSI-RS or SSB downlink beam to measure downlink signal quality.

In some aspects, the UE 104, the processor(s) 312, the communicating component 342 or one of its subcomponents may be configured for calculating a L1 signal-to-interference-plus-noise ratio (SINR) for the BFD/RRM measurement procedure based on one or more downlink CSI-RS beams and uplink SRS beam pairs.

In some aspects, the UE 104, the processor(s) 312, the communicating component 342 or one of its subcomponents configured for detecting whether the cell level failure event or the group level failure event is triggered further comprises detecting that a full beam failure event has occurred for all of the one or more groups of CORESETs 248 based on the cell level failure event being triggered.

In some aspects, the one or more groups of CORESETs 248 include a HD CORESET group and a FD CORESET group, and wherein detecting that the full beam failure event has occurred for all of the one or more groups of CORESETs further comprises: detecting a first partial beam failure event for the HD CORESET group based on the group level failure event being triggered; and detecting a second partial beam failure event for the FD CORESET group based on the group level failure event being triggered.

In some aspects, the UE 104, the processor(s) 312, the communicating component 342 or one of its subcomponents configured for detecting whether the cell level failure event or the group level failure event is triggered further comprises detecting that a full beam failure event has occurred for at least one of the one or more groups of CORESETs 248 based on the cell level failure event being triggered.

In some aspects, the at least one of the one or more groups of CORESETs 248 corresponds to a HD CORESET group, and wherein detecting that the full beam failure event has occurred for the at least one of the one or more groups of CORESETs further comprises detecting a partial beam failure event for a FD CORESET group of the one or more groups of CORESETs 248 based on the group level failure event being triggered.

In some aspects, the at least one of the one or more groups of CORESETs 248 corresponds to a FD CORESET group, and wherein detecting that the full beam failure event has occurred for the at least one of the one or more groups of CORESETs further comprises detecting a partial beam failure event for a HD CORESET group of the one or more groups of CORESETs 248 based on the group level failure event being triggered. In an example, UE 104 may be configured to determine which use case corresponding to the at least one of the one or more groups of CORESETs corresponds to a HD CORESET group or the at least one of the one or more groups of CORESETs corresponds to a FD CORESET group to perform for BFD. In some instances, if both cases are configured, UE 104 may receive a signal from the base station 102 indicating which case to use for BFD.

FIG. 5 illustrates a flow chart of an example of a method 500 for wireless communication at a network entity, such as the network entity 102. In an example, a base station 102 can perform the functions described in method 500 using one or more of the components described in FIGS. 1, 2, 4, and 6.

At block 502, the method 500 may determine one or more groups of CORESETs, each of the one or more groups of CORESETs include at least one HD CORESET, FD CORE- SET, or combination thereof. In an aspect, the communicating component 242, e.g., in conjunction with processor(s) 212, memory 216, and/or transceiver 202, may be configured to determine one or more groups of CORESETs 248, each of the one or more groups of CORESETs 248 include at least one HD CORESET 250, FD CORESET 252, or combination thereof. Thus, the base station 102, the processor(s) 212, the communicating component 242 or one of its subcomponents may define the means for determining one or more groups of CORESETs 248, each of the one or more groups of CORESETs 248 include at least one HD CORESET 250, FD CORESET 252, or combination thereof.

In some aspects, the one or more groups of CORESETs 248 include a first group comprising only of one or more HD CORESETs 250 and a second group comprising only of one or more FD CORESETs 252.

In some aspects, each of the one or more groups of CORESETs 248 includes a combination of one or more HD CORESETs 250 and one or more FD CORESETs 252.

In some aspects, each of one or more transmission reception points (TRPs) or TRP pairs include different groups of the one or more groups of CORESETs 248. For example, the TRPs may correspond to one or more of a UE, such as UE 104, and a network entity, such as base station 102.

At block 504, the method 500 may transmit one or more of the at least one HD CORESET and FD CORESET of the one or more groups of CORESETs to a UE. In an aspect, the communicating component 242, e.g., in conjunction with processor(s) 212, memory 216, and/or transceiver 202, may be configured to transmit one or more of the at least one HD CORESET 250 and FD CORESET 252 of the one or more groups of CORESETs 248 to a UE 104. Thus, the base station 102, the processor(s) 212, the communicating component 242 or one of its subcomponents may define the means for transmitting one or more of the at least one HD CORESET 250 and FD CORESET 252 of the one or more groups of CORESETs 248 to a UE 104.

At block 506, the method 500 may receive a beam failure recovery request from the UE based on at least one of a cell level failure event or a group level failure event that is triggered based on a BFD measurement procedure at the UE. In an aspect, the communicating component 242, e.g., in conjunction with processor(s) 212, memory 216, and/or transceiver 202, may be configured to receive a beam failure recovery request from the UE 104 based on at least one of a cell level failure event or a group level failure event that is triggered based on a BFD measurement procedure at the UE 104. Thus, the base station 102, the processor(s) 212, the communicating component 242 or one of its subcomponents may define the means for receiving a beam failure recovery request from the UE 104 based on at least one of a cell level failure event or a group level failure event that is triggered based on a BFD measurement procedure at the UE 104.

In some aspects, the base station 102, the processor(s) 212, the communicating component 242 or one of its subcomponents may be configured for transmitting a message indicating the one or more groups of CORESETs 248 from the network entity 102.

In some aspects, the base station 102, the processor(s) 212, the communicating component 242 or one of its subcomponents may be configured for determining a bi-directional TCI state that may include a downlink and uplink RS/beam pair quasi co-located (QCLed) Type D in a corresponding identification (ID) for the at least one HD CORESET 250 and FD CORESET 252.

In some aspects, the base station 102, the processor(s) 212, the communicating component 242 or one of its subcomponents may be configured for receiving a BFD report based on transmitting the one or more of the at least one HD CORESET 250 and FD CORESET 252 from the UE 104, wherein the BFD report indicates at least one of a cell level failure event or a group level failure event is triggered based on a BFD measurement procedure performed by the UE 104.

In some aspects, the BFD report includes a L1 RSRP for a BFD/RRM measurement procedure performed by the UE 104 based on one or more downlink CSI-RS beams.

In some aspects, the BFD report includes a L1 SINR for a BFD/RRM measurement procedure performed by the UE 104 based on one or more downlink CSI-RS beams and uplink SRS beam pairs.

In some aspects, the BFD report indicates a full beam failure event has occurred for all of the one or more groups of CORESETs 248 based on the cell level failure event being triggered.

In some aspects, the BFD report indicates a full beam failure event has occurred for at least one of the one or more groups of CORESETs 248 based on the cell level failure event being triggered.

Figure 6:
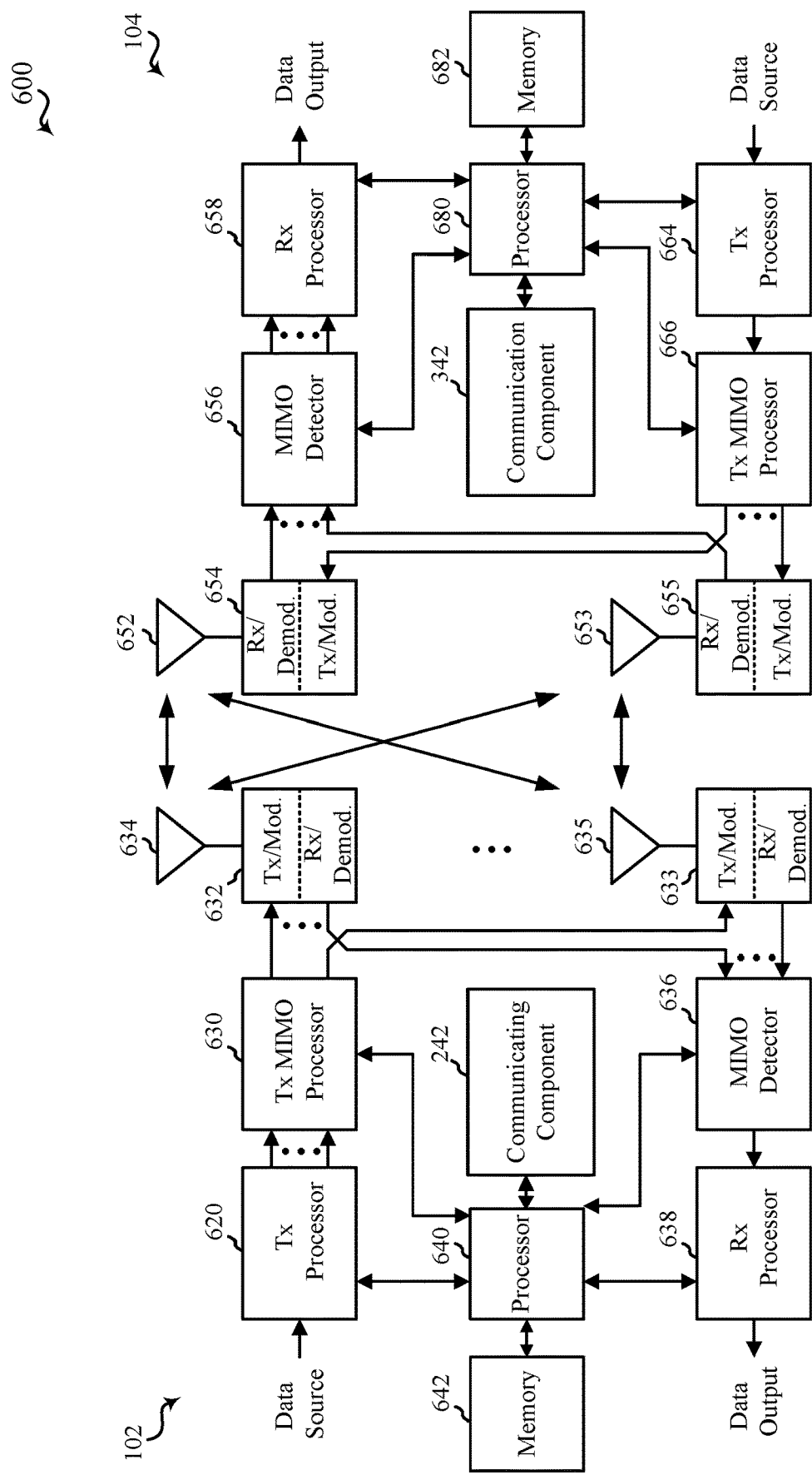
FIG. 6 is a block diagram illustrating an example of a MIMO communication system including a base station and a UE, in accordance with various aspects of the present disclosure.

FIG. 6 is a block diagram of a MIMO communication system 600 including a base station 102 and a UE 104. The MIMO communication system 600 may illustrate aspects of the wireless communication access network 100 described with reference to FIG. 1. The base station 102 may be an example of aspects of the base station 102 described with reference to FIG. 1. The base station 102 may be equipped with antennas 634 and 635, and the UE 104 may be equipped with antennas 652 and 653. In the MIMO communication system 600, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 620 may receive data from a data source. The transmit processor 620 may process the data. The transmit processor 620 may also generate control symbols or reference symbols. A transmit MIMO processor 630 may perform spatial processing (e.g., precoding) on data symbols, control symbols, or reference symbols, if applicable, and may provide output symbol streams to the transmit modulator/demodulators 632 and 633. Each modulator/demodulator 632 through 633 may process a respective output symbol stream (e.g., for OFDM, etc.) to obtain an output sample stream. Each modulator/demodulator 632 through 633 may further process (e.g., convert to analog, amplify, filter, and upconvert) the output sample stream to obtain a DL signal. In one example, DL signals from modulator/demodulators 632 and 633 may be transmitted via the antennas 634 and 635, respectively.

The UE 104 may be an example of aspects of the UEs 104 described with reference to FIGS. 1 and 3. At the UE 104, the UE antennas 652 and 653 may receive the DL signals from the base station 102 and may provide the received signals to the modulator/demodulators 654 and 655, respectively. Each modulator/demodulator 654 through 655 may condition (e.g., filter, amplify, downconvert, and digitize) a respective received signal to obtain input samples. Each modulator/demodulator 654 through 655 may further process the input samples (e.g., for OFDM, etc.) to obtain received symbols. A MIMO detector 656 may obtain received symbols from the modulator/demodulators 654 and 655, perform MIMO detection on the received symbols, if applicable, and provide detected symbols. A receive (Rx) processor 658 may process (e.g., demodulate, deinterleave, and decode) the detected symbols, providing decoded data for the UE 104 to a data output, and provide decoded control information to a processor 680, or memory 682.

The processor 680 may in some cases execute stored instructions to instantiate a communicating component 342 (see e.g., FIGS. 1 and 3).

On the uplink (UL), at the UE 104, a transmit processor 664 may receive and process data from a data source. The transmit processor 664 may also generate reference symbols for a reference signal. The symbols from the transmit processor 664 may be precoded by a transmit MIMO processor 666 if applicable, further processed by the modulator/demodulators 654 and 655 (e.g., for SC-FDMA, etc.), and be transmitted to the base station 102 in accordance with the communication parameters received from the base station 102. At the base station 102, the UL signals from the UE 104 may be received by the antennas 634 and 635, processed by the modulator/demodulators 632 and 633, detected by a MIMO detector 636 if applicable, and further processed by a receive processor 638. The receive processor 638 may provide decoded data to a data output and to the processor 640 or memory 642.

The processor 640 may in some cases execute stored instructions to instantiate a communicating component 242 (see e.g., FIGS. 1 and 2).

The components of the UE 104 may, individually or collectively, be implemented with one or more ASICs adapted to perform some or all of the applicable functions in hardware. Each of the noted modules may be a means for performing one or more functions related to operation of the MIMO communication system 600. Similarly, the components of the base station 102 may, individually or collectively, be implemented with one or more ASICs adapted to perform some or all of the applicable functions in hardware. Each of the noted components may be a means for performing one or more functions related to operation of the MIMO communication system 600.

Some Further Example Clauses

Implementation examples are described in the following numbered clauses:

1. A method of wireless communication at a user equipment (UE), comprising:
   identifying one or more groups of control resource sets (CORESETs), each of the one or more groups of CORESETs include at least one half-duplex (HD) CORESET, full-duplex (FD) CORESET, or combination thereof;
   receiving one or more of the at least one HD CORESET and FD CORESET of the one or more groups of CORESETs from a network entity;
   performing a beam failure detection (BFD) measurement procedure with a reference signal associated with at least one CORESET of the one or more groups of CORESETs; and
   detecting whether a cell level failure event or a group level failure event is triggered based on the BFD measurement procedure.

2. The method of any preceding clause, wherein the one or more groups of CORESETs include a first group comprising only of one or more HD CORESETs and a second group comprising only of one or more FD CORESETs.

3. The method of clause any preceding clause, wherein each of the one or more groups of CORESETs includes a combination of one or more HD CORESETs and one or more FD CORESETs.

4. The method of any preceding clause, wherein each of one or more transmission reception points (TRPs) or TRP pairs include different groups of the one or more groups of CORESETs.

5. The method of any preceding clause, wherein identifying the one or more groups of CORESETs further comprises receiving a message indicating the one or more groups of CORESETs from the network entity.

6. The method of any preceding clause, further comprising performing a failure recovery procedure in response to detecting at least one of the cell level failure event or the group level failure event.

7. The method of any preceding clause, wherein performing the BFD measurement procedure with the reference signal further comprises determining the RS with a transmission configuration indicator (TCI) state quasi co-located (QCLed) Type D in a corresponding identification (ID) for the at least one HD CORESET and FD CORESET.

8. The method of any preceding clause, wherein the reference signal corresponds to a channel state information RS (CSI-RS).

9. The method of any preceding clause, further comprising performing downlink BFD/radio resource management (RRM) measurement procedure at a one or more CSI-RS resource locations for a CSI-RS beam corresponding to the TCI state.

10. The method of any preceding clause, further comprising calculating a Layer 1 (L1) reference signal receive power (RSRP) for the BFD/RRM measurement procedure based on one or more downlink CSI-RS beams.

11. The method of any preceding clause, further comprising:
   detecting an uplink beam corresponding to a sounding reference signal (SRS) beam paired with a CSI-RS beam corresponding to the TCI state in the corresponding ID for the FD CORESET; and
   performing uplink BFD/radio resource management (RRM) measurement procedure for the SRS beam to measure self-interference.

12. The method of any preceding clause, further comprising calculating a Layer 1 (L1) signal-to-interference-plus-noise ratio (SINR) for the BFD/RRM measurement procedure based on one or more downlink CSI-RS beams and uplink sounding reference signal (SRS) beam pairs.

13. The method of any preceding clause, wherein detecting whether the cell level failure event or the group level failure event is triggered further comprises detecting that a full beam failure event has occurred for all of the one or more groups of CORESETs based on the cell level failure event being triggered.

14. The method of any preceding clause, wherein the one or more groups of CORESETs include a HD CORESET group and a FD CORESET group, and
   wherein detecting that the full beam failure event has occurred for all of the one or more groups of CORESETs further comprises:
   detecting a first partial beam failure event for the HD CORESET group based on the group level failure event being triggered; and
   detecting a second partial beam failure event for the FD CORESET group based on the group level failure event being triggered.

15. The method of any preceding clause, wherein detecting whether the cell level failure event or the group level failure event is triggered further comprises detecting that a full beam failure has occurred for at least one of the one or more groups of CORESETs based on the cell level failure event being triggered.

16. The method of any preceding clause, wherein the at least one of the one or more groups of CORESETs corresponds to a HD CORESET group, and
wherein detecting that the full beam failure event has occurred for the at least one of the one or more groups of CORESETs further comprises:
detecting a partial beam failure event for a FD CORESET group of the one or more groups of CORESETs based on the group level failure event being triggered.

17. The method of any preceding clause, wherein the at least one of the one or more groups of CORESETs corresponds to a FD CORESET group, and
wherein detecting that the full beam failure event has occurred for the at least one of the one or more groups of CORESETs further comprises:
detecting a partial beam failure event for a HD CORESET group of the one or more groups of CORESETs based on the group level failure event being triggered.

18. A method of wireless communication at a network entity, comprising:
determining one or more groups of control resource sets (CORESETs), each of the one or more groups of CORESETs include at least one half-duplex (HD) CORESET, full-duplex (FD) CORESET, or combination thereof;
transmitting one or more of the at least one HD CORESET and FD CORESET of the one or more groups of CORESETs to a user equipment (UE); and
receiving a beam failure recovery request from the UE based on at least one of a cell level failure event or a group level failure event that is triggered based on a BFD measurement procedure at the UE.

19. The method of any preceding clause, wherein the one or more groups of CORESETs include a first group comprising only of one or more HD CORESETs and a second group comprising only of one or more FD CORESETs.

20. The method of any preceding clause, wherein each of the one or more groups of CORESETs includes a combination of one or more HD CORESETs and one or more FD CORESETs.

21. The method of any preceding clause, wherein each of one or more transmission reception points (TRPs) or TRP pairs include different groups of the one or more groups of CORESETs.

22. The method of any preceding clause, further comprises transmitting a message indicating the one or more groups of CORESETs from the network entity.

23. The method of any preceding clause, further comprising determining a transmission configuration indicator (TCI) state quasi co-located (QCLed) Type D in a corresponding identification (ID) for the at least one HD CORESET and FD CORESET.

24. The method of any preceding clause, further comprising receiving a beam failure detection (BFD) report based on transmitting the one or more of the at least one HD CORESET and FD CORESET from the UE, wherein the BFD report indicates at least one of a cell level failure event or a group level failure event is triggered based on a BFD measurement procedure performed by the UE.

25. The method of any preceding clause, wherein the BFD report includes a Layer 1 (L1) reference signal receive power (RSRP) for a BFD/radio resource management (RRM) measurement procedure performed by the UE based on one or more downlink channel state information reference signal (CSI-RS) beams.

26. The method of any preceding clause, wherein the BFD report includes a Layer 1 (L1) signal-to-interference-plus-noise ratio (SINR) for a BFD/radio resource management (RRM) measurement procedure performed by the UE based on one or more downlink channel state information reference signal (CSI-RS) beams and uplink sounding reference signal (SRS) beam pairs.

27. The method of any preceding clause, wherein the BFD report indicates a full beam failure event has occurred for all of the one or more groups of CORESETs based on the cell level failure event being triggered.

28. The method of any preceding clause, wherein the BFD report indicates a full beam failure event has occurred for at least one of the one or more groups of CORESETs based on the cell level failure event being triggered.

29. An apparatus for wireless communication, comprising:
a transceiver;
a memory configured to store instructions; and
one or more processors communicatively coupled with the transceiver and the memory, wherein the one or more processors are configured to:
identify one or more groups of control resource sets (CORESETs), each of the one or more groups of CORESETs include at least one half-duplex (HD) CORESET, full-duplex (FD) CORESET, or combination thereof;
receive one or more of the at least one HD CORESET and FD CORESET of the one or more groups of CORESETs from a network entity;
perform a beam failure detection (BFD) measurement procedure with a reference signal associated with at least one CORESET of the one or more groups of CORESETs; and
detect whether a cell level failure event or a group level failure event is triggered based on the BFD measurement procedure.

30. An apparatus for wireless communication, comprising:
a transceiver;
a memory configured to store instructions; and
one or more processors communicatively coupled with the transceiver and the memory, wherein the one or more processors are configured to:
determining one or more groups of control resource sets (CORESETs), each of the one or more groups of CORESETs include at least one half-duplex (HD) CORESET, full-duplex (FD) CORESET, or combination thereof;
transmitting one or more of the at least one HD CORESET and FD CORESET of the one or more groups of CORESETs to a user equipment (UE); and
receiving a beam failure recovery request from the UE based on at least one of a cell level failure event or a group level failure event that is triggered based on a BFD measurement procedure at the UE.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, hardwiring, or combinations of any of these. Features implementing functions may also be physically located at various positions, including being distributed such that portions of functions are implemented at different physical locations. Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. Also, as used herein, including in the claims, "or" as used in a list of items prefaced by "at least one of" indicates a disjunctive list such that, for example, a list of "at least one of A, B, or C" means A or B or C or AB or AC or BC or ABC (A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method of wireless communication at a user equipment (UE), comprising:
identifying one or more groups of multiple control resource sets (CORESETs), the multiple CORESETs include at least one half-duplex (HD) CORESET for a HD mode at the UE, and at least one full-duplex (FD) CORESET for FD mode at the UE;
receiving, from a network entity, the at least one HD CORESET and the at least one FD CORESET;
performing a beam failure detection (BFD) measurement procedure with a reference signal associated with at least one CORESET of the one or more groups of multiple CORESETs; and
detecting whether a cell level failure event of a cell or a group level failure event of one of the one or more groups of multiple CORESETs is triggered based on the BFD measurement procedure.

2. The method of claim 1, wherein the one or more groups of multiple CORESETs include a first group comprising only of one or more HD CORESETs, including the at least one HD CORESET, and a second group comprising only of one or more FD CORESETs, including the at least one FD CORESET.

3. The method of claim 1, wherein each of the one or more groups of multiple CORESETs includes a combination of one or more HD CORESETs and one or more FD CORESETs.

4. The method of claim 3, wherein each of one or more transmission reception points (TRPs) or TRP pairs include different groups of the one or more groups of multiple CORESETs.

5. The method of claim 3, wherein identifying the one or more groups of multiple CORESETs further comprises receiving a message indicating the one or more groups of multiple CORESETs from the network entity.

6. The method of claim 1, further comprising performing a failure recovery procedure in response to detecting at least one of the cell level failure event or the group level failure event.

7. The method of claim 1, wherein performing the BFD measurement procedure with the reference signal further comprises determining a reference signal with a transmission configuration indicator (TCI) state quasi co-located (QCLed) Type D in a corresponding identification (ID) for the at least one HD CORESET or the at least one FD CORESET.

8. The method of claim 7, wherein the reference signal corresponds to a channel state information RS (CSI-RS).

9. The method of claim 8, further comprising performing downlink BFD/radio resource management (RRM) measurement procedure at one or more CSI-RS resource locations for a CSI-RS beam corresponding to the TCI state.

10. The method of claim 9, further comprising calculating a Layer 1 (L1) reference signal receive power (RSRP) for the BFD/RRM measurement procedure based on one or more downlink CSI-RS beams.

11. The method of claim 8, further comprising:
detecting an uplink beam corresponding to a sounding reference signal (SRS) beam paired with a CSI-RS beam corresponding to the TCI state in the corresponding ID for the at least one FD CORESET; and
performing uplink BFD/radio resource management (RRM) measurement procedure for the SRS beam to measure self-interference.

12. The method of claim 11, further comprising calculating a Layer 1 (L1) signal-to-interference-plus-noise ratio (SINR) for the BFD/RRM measurement procedure based on one or more downlink CSI-RS beams and uplink sounding reference signal (SRS) beam pairs.

13. The method of claim 1, wherein detecting whether the cell level failure event or the group level failure event is triggered further comprises detecting that a full beam failure event has occurred for all of the one or more groups of multiple CORESETs based on the cell level failure event being triggered.

14. The method of claim 13, wherein the one or more groups of multiple CORESETs include a HD CORESET group and a FD CORESET group, and
wherein detecting that the full beam failure event has occurred for all of the one or more groups of multiple CORESETs further comprises:
detecting a first partial beam failure event for the HD CORESET group based on the group level failure event being triggered; and
detecting a second partial beam failure event for the FD CORESET group based on the group level failure event being triggered.

15. The method of claim 1, wherein detecting whether the cell level failure event or the group level failure event is triggered further comprises detecting that a full beam failure event has occurred for at least one of the one or more groups of multiple CORESETs based on the cell level failure event being triggered.

16. The method of claim 15, wherein the at least one of the one or more groups of multiple CORESETs corresponds to a HD CORESET group, and
wherein detecting that the full beam failure event has occurred for the at least one of the one or more groups of multiple CORESETs further comprises:
detecting a partial beam failure event for a FD CORESET group of the one or more groups of multiple CORESETs based on the group level failure event being triggered.

17. The method of claim 15, wherein the at least one of the one or more groups of multiple CORESETs corresponds to a FD CORESET group, and
wherein detecting that the full beam failure event has occurred for the at least one of the one or more groups of multiple CORESETs further comprises:
detecting a partial beam failure event for a HD CORESET group of the one or more groups of multiple CORESETs based on the group level failure event being triggered.

18. A method of wireless communication at a network entity, comprising:
determining one or more groups of multiple control resource sets (CORESETs), the multiple CORESETs include at least one half-duplex (HD) CORESET for HD mode at a user equipment (UE), and at least one full-duplex (FD) CORESET for FD mode at the UE;
transmitting, to the UE, one or more at least one HD CORESET and the at least one FD CORESET; and
receiving a beam failure recovery request from the UE based on at least one of a cell level failure event of a cell or a group level failure event of one of the one or more groups of multiple CORESETs that is triggered based on a BFD measurement procedure at the UE.

19. The method of claim 18, wherein the one or more groups of multiple CORESETs include a first group comprising only of one or more HD CORESETs, including the at least one HD CORESET, and a second group comprising only of one or more FD CORESETs, including the at least one FD CORESET.

20. The method of claim 18, wherein each of the one or more groups of multiple CORESETs includes a combination of one or more HD CORESETs and one or more FD CORESETs.

21. The method of claim 20, wherein each of one or more transmission reception points (TRPs) or TRP pairs include different groups of the one or more groups of multiple CORESETs.

22. The method of claim 20, further comprises transmitting a message indicating the one or more groups of multiple CORESETs from the network entity.

23. The method of claim 18, further comprising determining a transmission configuration indicator (TCI) state quasi co-located (QCLed) Type D in a corresponding identification (ID) for the at least one HD CORESET or the at least one FD CORESET.

24. The method of claim 18, further comprising receiving a beam failure detection (BFD) report based on transmitting the one or more of the at least one HD CORESET or the at least one FD CORESET from the UE, wherein the BFD report indicates at least one of a cell level failure event or a group level failure event is triggered based on a BFD measurement procedure performed by the UE.

25. The method of claim 24, wherein the BFD report includes a Layer 1 (L1) reference signal receive power (RSRP) for a BFD/radio resource management (RRM) measurement procedure performed by the UE based on one or more downlink channel state information reference signal (CSI-RS) beams.

26. The method of claim 24, wherein the BFD report includes a Layer 1 (L1) signal-to-interference-plus-noise ratio (SINR) for a BFD/radio resource management (RRM) measurement procedure performed by the UE based on one or more downlink channel state information reference signal (CSI-RS) beams and uplink sounding reference signal (SRS) beam pairs.

27. The method of claim 24, wherein the BFD report indicates a full beam failure event has occurred for all of the one or more groups of multiple CORESETs based on the cell level failure event being triggered.

28. The method of claim 24, wherein the BFD report indicates a full beam failure event has occurred for at least one of the one or more groups of multiple CORESETs based on the cell level failure event being triggered.

29. An apparatus for wireless communication, comprising:
- a transceiver;
- a memory configured to store instructions; and
- one or more processors communicatively coupled with the transceiver and the memory, wherein the one or more processors are configured to:
  - identify one or more groups of multiple control resource sets (CORESETs), the multiple CORESETs include at least one half-duplex (HD) CORESET for HD mode at the apparatus, and at least one full-duplex (FD) CORESET for FD mode at the apparatus;
  - receive, from a network entity, the at least one HD CORESET and the at least one FD CORESET;
  - perform a beam failure detection (BFD) measurement procedure with a reference signal associated with at least one CORESET of the one or more groups of multiple CORESETs; and
  - detect whether a cell level failure event of a cell or a group level failure event of one of the one or more groups of multiple CORESETs is triggered based on the BFD measurement procedure.

30. An apparatus for wireless communication, comprising:
- a transceiver;
- a memory configured to store instructions; and
- one or more processors communicatively coupled with the transceiver and the memory, wherein the one or more processors are configured to:
  - determining one or more groups of multiple control resource sets (CORESETs), the multiple CORESETs include at least one half-duplex (HD) CORESET for HD mode at a user equipment (UE), and a full-duplex (FD) CORESET for FD mode at the UE;
  - transmitting, to the UE, the at least one HD CORESET and the at least one FD CORESET; and
  - receiving a beam failure recovery request from the UE based on at least one of a cell level failure event of a cell or a group level failure event of one of the one or more groups of multiple CORESETs that is triggered based on a BFD measurement procedure at the UE.

* * * * *